(12) United States Patent
Drake et al.

(10) Patent No.: US 9,009,656 B2
(45) Date of Patent: Apr. 14, 2015

(54) SOURCE CODE ANALYSIS ARCHIVAL ADAPTER FOR STRUCTURED DATA MINING

(75) Inventors: Daniel R. Drake, Apex, NC (US); Erich S. Magee, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1521 days.

(21) Appl. No.: 11/381,196

(22) Filed: May 2, 2006

(65) Prior Publication Data

US 2007/0261036 A1     Nov. 8, 2007

(51) Int. Cl.
*G06F 9/44* (2006.01)

(52) U.S. Cl.
CPC .......................... *G06F 8/36* (2013.01)

(58) Field of Classification Search
CPC .............. G06Q 10/06; G06F 8/20; G06F 8/71
USPC .......................................... 717/100–109, 120
See application file for complete search history.

(56) References Cited

U.S. PATENT DOCUMENTS

| | | | |
|---|---|---|---|
| 5,916,308 A | 6/1999 | Duncan et al. | |
| 6,209,124 B1 * | 3/2001 | Vermeire et al. | 717/114 |
| 6,292,843 B1 | 9/2001 | Romano | |
| 6,865,742 B1 | 3/2005 | Khare et al. | |
| 7,526,753 B2 * | 4/2009 | Spencer et al. | 717/109 |
| 2002/0029231 A1 * | 3/2002 | Aptus et al. | 707/513 |
| 2003/0084063 A1 | 5/2003 | DelMonaco et al. | |
| 2003/0163585 A1 * | 8/2003 | Elderon et al. | 709/246 |
| 2003/0187656 A1 | 10/2003 | Goose et al. | |
| 2004/0064788 A1 * | 4/2004 | Gownder et al. | 715/513 |
| 2004/0133897 A1 | 7/2004 | Covely, III | |
| 2004/0139370 A1 | 7/2004 | Bailey et al. | |
| 2004/0187141 A1 | 9/2004 | Tobin | |
| 2006/0195784 A1 * | 8/2006 | Koivisto et al. | 715/523 |
| 2007/0299825 A1 * | 12/2007 | Rush et al. | 707/3 |

* cited by examiner

*Primary Examiner* — Anna Deng
(74) *Attorney, Agent, or Firm* — Cuenot, Forsythe & Kim, LLC

(57) ABSTRACT

Embodiments of the present invention address deficiencies of the art in respect to code reuse management and provide a method, system and computer program product for source code archival adapter for structured data mining In one embodiment of the invention, a method for adapting archived source code for structured data mining for source code reuse can be provided. The method can include parsing source code to identify individual classification elements within the source code, generating a markup language formatted set of code constructs corresponding to the classification elements, and storing the markup language formatted set of code constructs in a source code archive.

6 Claims, 1 Drawing Sheet

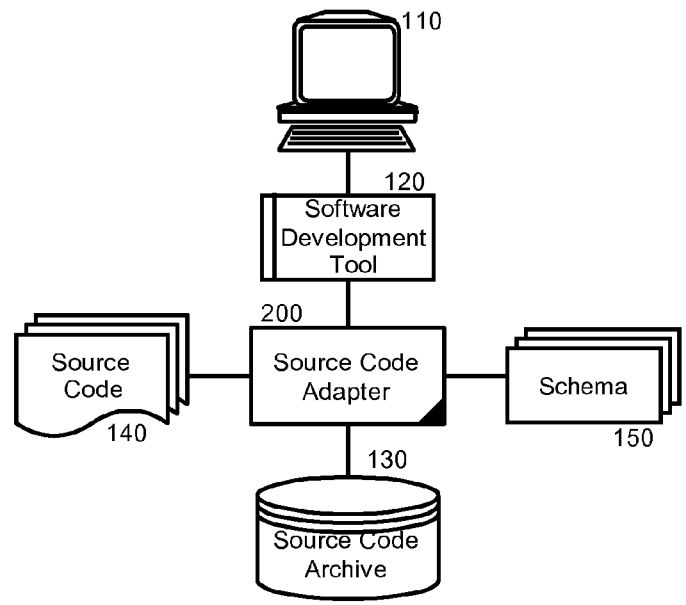
FIG. 1
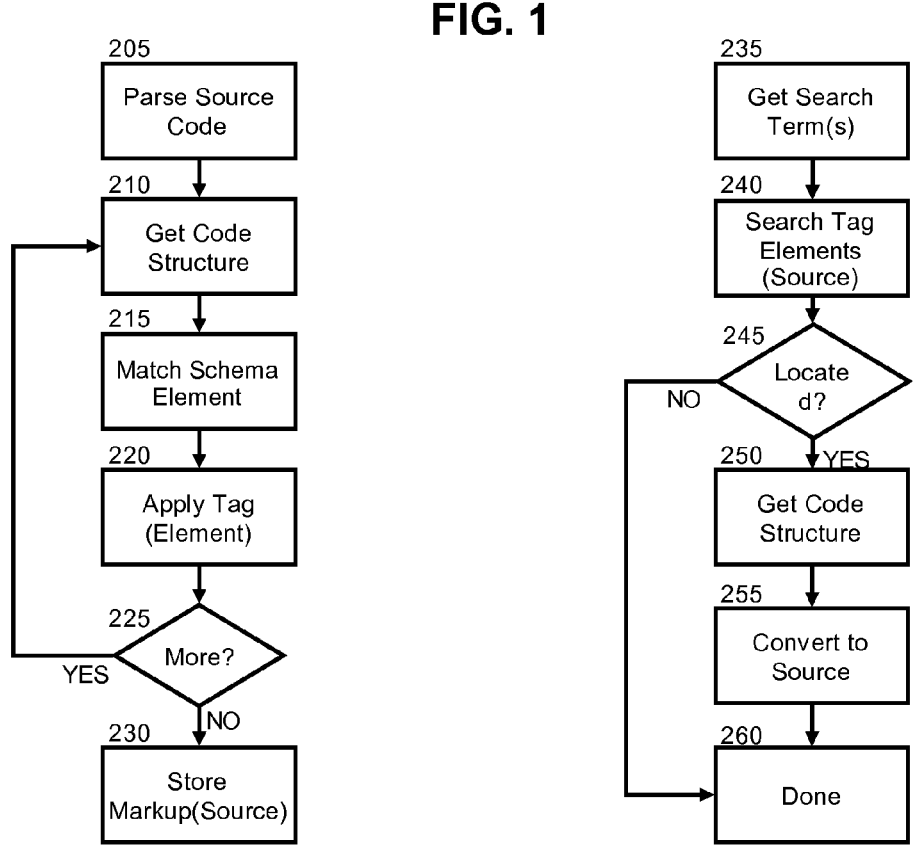
FIG. 2A　　　　　FIG. 2B

US 9,009,656 B2

SOURCE CODE ANALYSIS ARCHIVAL ADAPTER FOR STRUCTURED DATA MINING

BACKGROUND OF THE INVENTION

1. Field of the Invention

The present invention relates to the field of software development tools and more particularly to source code reuse within a software development tool.

2. Description of the Related Art

Software development refers to the design and coding of computer programs. Traditionally, software development involves the architecting of a computer program within a project and the source code specification of different portions of the computer program. The source code specification of the different portions of the computer program can be compiled and linked with binary resources such as multimedia and user interface elements into an executable or interpretable computer program or set of computer programs. In many cases, the process of software development can be performed within a software development tool such as an integrated development environment.

For smaller software development projects, little more is required of a software development tool to be effective because oftentimes, only one or two developers interact with the software development tool. For larger software development projects involving dozens of developers, however, simple software development tools fall short. In particular, for smaller software development projects, every portion of a computer program can be written to specification from scratch. In larger projects, however, strategic code reuse can save substantial sums in terms of money, resources and man hours.

Code reuse refers to the reuse of code already written to achieve a particular specification. Code reuse occurs not only within a single organization, but also across multiple organizations and in the global community at large due in part to the ubiquitous nature of the Internet. In highly organized software development environments, code reuse has become institutionalized wherein sophisticated software development tools provided archives of source code. Source code archives intended for source code reuse have proven ineffective in as much as locating a particular portion of source code in an automated fashion is not impossible.

While complete source code modules can be readily located, portions or snippets of source code within a module can be difficult to locate. Worse yet, disparate code structures common across disparate software development project inhibit the uniform organization of source code intended for code reuse. The introduction of markup language defined interactive programs such as hypertext markup language (HTML) based applications further complicates matters as the structure of an HTML document differs dramatically from that of more traditional source code.

BRIEF SUMMARY OF THE INVENTION

Embodiments of the present invention address deficiencies of the art in respect to code reuse management and provide a novel and non-obvious method, system and computer program product for source code archival adapter for structured data mining In one embodiment of the invention, a method for adapting archived source code for structured data mining for source code reuse can be provided. The method can include parsing source code to identify individual classification elements within the source code, generating a markup language formatted set of code constructs corresponding to the classification elements, and storing the markup language formatted set of code constructs in a source code archive.

The method further can include indexing the markup language formatted set of code constructs in the source code archive, and keyword searching the indexed markup language formatted set of code constructs to locate code constructs of interest. Once code constructs of interest have been located, the method can include retrieving the located code constructs of interest, and transforming the retrieved code constructs of interest into source code suitable for code reuse in a software development project.

In another embodiment of the invention, a software development data processing system can be provided. The system can include a source code reuse repository comprising a source code archive, a software development tool coupled to the source code reuse repository, and a source code adapter disposed within the source code reuse repository. The source code adapter can include program code enabled to parse source code to identify individual classification elements within the source code, generate a markup language formatted set of code constructs corresponding to the classification elements, and store the markup language formatted set of code constructs in the source code archive. The system further can include a schema specifying markup language tags for a set of code constructs corresponding to the classification elements. Finally, the system can include a keyword search query interface to the source code archive.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a schematic illustration of a software development data processing system configured for structured data mining of archived source code for source code reuse; and, FIGS. 2A and 2B, taken together, are a flow chart illustrating a process for adapting archived source code for structured data mining for source code reuse.

DETAILED DESCRIPTION OF THE INVENTION

Embodiments of the present invention provide a method, system and computer program product for adapting archived source code for structured data mining for source code reuse. In accordance with an embodiment of the present invention, source code can be parsed and statements within the source code can be classified. The parsed and classified source code can be transformed into markup conforming to a common source code schema and archived as markup. The archived markup can be searched to locate reusable code portions and selected reusable code portions can be retrieved for code reuse. Upon retrieval, the selected reusable code portions can be restored from markup form to source code form. In this way, reusable code portions can be more readily located and reused irrespective of the heterogeneous nature of source code across different projects.

In further illustration of an embodiment of the present invention, FIG. 1 is a schematic illustration of a software development data processing system configured for structured data mining of archived source code for source code reuse. The system can include a host computing platform 110 configured to host the operation of a software development tool 120, such as the Eclipse (TM) extensible development platform distributed by the Eclipse Foundation and its members. The development tool 120 further can be configured for code reuse through the persistence and retrieval of reusable source code in the code reuse repository 160.

The code reuse repository 160 can include a source code archive 130 coupled to the software development tool 120 via source code adapter 200. The source code adapter 200 can include program code enabled to process source code 140 into markup language formatted code portions according to the markup language schema 150. Specifically, the source code adapter 200 can parse the source code 140 to identify different code constructs within the source code 140.

The different code constructs can be denoted by markup language tags provided by the schema 150 and stored into the source code archive 130. In this way, the constructs can be located subsequently within the source code archive 130 through searching markup language denoted code portions. Once located, the markup language denoted code portions can be returned to source code form for code reuse.

In further illustration of the operation of the source code adapter, FIGS. 2A and 2B, taken together, are a flow chart illustrating a process for adapting archived source code for structured data mining for source code reuse. Beginning in block 205 of FIG. 2A, source code can be parsed to identify different portions of the source code associated with different code constructs. Examples can include classification elements including data member declarations, function declarations, event listeners and the like.

In block 210, a first code structure can be selected and in block 215, the code structure can be matched to a schema element within a markup language schema for the source code. In block 220, a markup language tag can be applied to the code structure and the process can repeat through decision block 225 for additional selected code structures in the source code. When the source code has been fully processed, in block 230 the markup language tagged code structures can be stored for subsequent indexing, searching and retrieval.

Turning now to FIG. 2B, once a set of tagged code structures have been stored in the source code archive, the structures can be indexed for searching and retrieval. In this regard, in block 235 one or more search terms can be accepted for searching the source code archive. In block 240, the search terms can be applied to the tagged code structures in order to locate code structures of interest. In decision block 245, if a code structure can be located, in block 250 the code structure can be retrieved. Thereafter, in block 255 the located code structures can be converted to native source code such that the native source code can be reused within a software development project. Finally, in block 260 the process can end.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer-implemented method for classifying source code, comprising:
    parsing the source code to identify individual classification elements, within the source code, representing separate code constructs;
    comparing an individual classification element representing an individual code construct with different schema elements within a markup language schema;
    applying a markup language tag to the individual code construct based upon the comparing; and
    generating a markup language formatted set of code constructs corresponding to the parsed individual classification elements, wherein the markup language formatted set of code constructions includes the individual code construct with the applied markup language tag;
    storing the markup language formatted set of code constructs in a source code archive;
    indexing the markup language formatted set of code constructs in the source code archive;
    keyword searching the indexed markup language formatted set of code constructs to locate markup language formatted code constructs;
    retrieving the located markup language formatted code constructs; and
    transforming the retrieved markup language formatted code constructs into source code suitable for code reuse.

2. The method of claim 1, wherein the identified individual classification elements are selected from the group consisting of:
    data member declarations,
    function declarations, and
    event listeners.

3. A computer hardware system configured to classify source code, comprising:
- at least one hardware processor configured to initiate and/or perform:
- parsing the source code to identify individual classification elements, within the source code, representing separate code constructs;
- comparing an individual classification element representing an individual code construct with different schema elements within a markup language schema;
- applying a markup language tag to the individual code construct based upon the comparing; and
- generating a markup language formatted set of code constructs corresponding to the parsed individual classification elements, wherein the markup language formatted set of code constructions includes the individual code construct with the applied markup language tag;
- storing the markup language formatted set of code constructs in a source code archive;
- indexing the markup language formatted set of code constructs in the source code archive;
- keyword searching the indexed markup language formatted set of code constructs to locate markup language formatted code constructs;
- retrieving the located markup language formatted code constructs; and
- transforming the retrieved markup language formatted code constructs into source code suitable for code reuse.

4. The system of claim 3, wherein the identified individual classification elements are selected from the group consisting of:
- data member declarations,
- function declarations, and
- event listeners.

5. A computer program product, comprising:
- a computer readable storage medium having stored therein computer-readable program code for classifying source code, the computer-readable program code, which when executed by a computer hardware system causes the computer hardware system to perform:
  - parsing the source code to identify individual classification elements, within the source code, representing separate code constructs;
  - comparing an individual classification element representing an individual code construct with different schema elements within a markup language schema;
  - applying a markup language tag to the individual code construct based upon the comparing; and
  - generating a markup language formatted set of code constructs corresponding to the parsed individual classification elements, wherein the markup language formatted set of code constructions includes the individual code construct with the applied markup language tag;
  - storing the markup language formatted set of code constructs in a source code archive;
  - indexing the markup language formatted set of code constructs in the source code archive;
  - keyword searching the indexed markup language formatted set of code constructs to locate markup language formatted code constructs;
  - retrieving the located markup language formatted code constructs; and
  - transforming the retrieved markup language formatted code constructs into source code suitable for code reuse, and wherein
- the computer readable storage medium is not a transitory, propagating signal per se.

6. The computer program product of claim 5, wherein the identified individual classification elements are selected from the group consisting of:
- data member declarations,
- function declarations, and
- event listeners.

* * * * *